(12) United States Patent
Sylvester et al.

(10) Patent No.: US 12,735,335 B2
(45) Date of Patent: Sep. 15, 2026

(54) SYSTEMS AND METHODS FOR ION EXCHANGE APPARATUS

(71) Applicant: Veolia Nuclear Solutions, Inc., Lafayette, CO (US)

(72) Inventors: Paul Sylvester, Denver, CO (US); Ben Garrett, Richland, WA (US); Nicephore Bonnet, Paris (FR); Brian Gaither, Pasco, WA (US); Clay Nulle, Pasco, WA (US); Jean-Christophe Yves Maurice Piroux, Arpaillargues-et-Aureillac (FR)

( * ) Notice: Subject to any disclaimer, the term of this patent is extended or adjusted under 35 U.S.C. 154(b) by 524 days.

(21) Appl. No.: 18/042,351

(22) PCT Filed: Aug. 19, 2021

(86) PCT No.: PCT/US2021/046625

§ 371 (c)(1),
(2) Date: Feb. 21, 2023

(87) PCT Pub. No.: WO2022/040387

PCT Pub. Date: Feb. 24, 2022

(65) Prior Publication Data

US 2023/0322585 A1 Oct. 12, 2023

Related U.S. Application Data

(60) Provisional application No. 63/201,024, filed on Apr. 8, 2021, provisional application No. 63/068,501, filed on Aug. 21, 2020.

(51) Int. Cl.
*C02F 1/42* (2023.01)
*B01J 47/022* (2017.01)

(52) U.S. Cl.
CPC .............. *C02F 1/42* (2013.01); *B01J 47/022* (2013.01); *C02F 2201/008* (2013.01)

(58) Field of Classification Search
None
See application file for complete search history.

(56) References Cited

U.S. PATENT DOCUMENTS 9,218,897 B1 12/2015 Braun
2013/0161260 A1 6/2013 Ferguson et al.
(Continued)

FOREIGN PATENT DOCUMENTS

JP 2016-512883 5/2016
JP 2017-037090 2/2017
(Continued)

OTHER PUBLICATIONS

Notice of Reasons for Refusal from Japan Patent Office in counterpart JP Pat. App. 2023-512446, Mar. 11, 2025 (12 pp.).
(Continued)

*Primary Examiner* — Peter Keyworth
(74) *Attorney, Agent, or Firm* — FisherBroyles, LLP

(57) ABSTRACT

Systems and methods are disclosed herein for ion exchange wherein process fluid is injected at multiple points within the ion exchange vessel simultaneously, allowing the contaminants and/or the contaminated process fluid to be distributed homogeneously throughout the ion exchange media. These systems and methods may be implemented in one or more of fixed, mobile, and modular embodiments.

14 Claims, 21 Drawing Sheets

SECTION A-A

(56) References Cited

U.S. PATENT DOCUMENTS

| | | | |
|---|---|---|---|
| 2014/0161218 A1 | 6/2014 | Loewen et al. | |
| 2015/0243379 A1 | 8/2015 | Buhlmann et al. | |
| 2015/0368136 A1 | 12/2015 | Raymont et al. | |
| 2018/0186662 A1* | 7/2018 | Barker | B01J 47/022 |
| 2020/0087170 A1 | 3/2020 | Barker et al. | |
| 2021/0147254 A1* | 5/2021 | Figola | C02F 1/004 |

FOREIGN PATENT DOCUMENTS

| | | |
|---|---|---|
| JP | 2017-523404 | 8/2017 |
| JP | 2018-530742 | 10/2018 |
| WO | WO 2014/151268 | 3/2014 |
| WO | WO 2017/027099 | 2/2017 |

OTHER PUBLICATIONS

International Search Report and Written Opinion from parent Int'l Pat. App. PCT/US2021/046625, Nov. 19, 2021 (12 pp.).

Response to Written Opinion of International Search Authority from parent Int'l Pat. App. PCT/US2021/046625, Jun. 21, 2022 (13 pp.).

Written Opinion of International Preliminary Examining Authority from parent Int'l Pat. App. PCT/US2021/046625, Jul. 14, 2022 (12 pp.).

Response to Written Opinion of International Preliminary Examining Authority from parent Int'l Pat. App. PCT/US2021/046625, Sep. 14, 2022 (15 pp.).

International Preliminary Report on Patentability from parent Int'l Pat. App. PCT/US2021/046625, Oct. 28, 2022 (9 pp.).

Communication from European Patent Office in counterpart EP Pat. App. 21769578.2, Jan. 24, 2025 (8 pp.).

Communication from European Patent Office in counterpart EP Pat. App. No. 26164372, filed Jun. 26, 2026 (9 pp.).

Examiner's Requisition from Canadian Intellectual Property Office in counterpart CA Pat. App. 3,190,582, Jul. 6, 2026 (8 pp.).

* cited by examiner

SECTION A-A

VESSEL ISO - SHELL REMOVED

VESSEL - SHIELD ASSEMBLY FRONT

SECTION D-D

Example Burst Disk

Example Catalytic Recombiner

SYSTEMS AND METHODS FOR ION EXCHANGE APPARATUS

TECHNICAL FIELD

This disclosure relates generally to systems and methods for ion exchange. More specifically, the disclosure relates to systems and methods for ion exchange wherein process fluid is injected at multiple points within the ion exchange vessel simultaneously, allowing the contaminants and/or the contaminated process fluid to be distributed homogenously throughout ion exchange media or sorbents.

BACKGROUND

Ion exchange processes are generally used for purifying or reducing contaminants from fluid by using bead-form resin ("media") fabricated from an organic polymer substrate, or granulated inorganic compounds, and then placed in a column. The contaminated fluid typically flows vertically through the media within the column, entering and exiting through processing inlets and outlets. In its basic form, ion exchange typically involves the exchange of ions between a solid particulate and liquid phase, and this action may be accomplished by utilizing a wide variety of known processes and apparatus. Typical ion exchange column design focuses on maximizing the utilization of the media capacity and minimizing any dead space in the media column where the contained ion exchange or adsorption media would have poor contact with the fluid being treated. Known in the art ion exchange approaches have focused on the design of the fluid distributors and columns. As an example, fractal distribution produces a homogeneous flow of fluid by placing the distribution orifices at the same distance from a center distribution opening, allowing a more constant pressure drop across the entire distributor. Improvements to column configuration are currently used to generate a narrow, defined reaction front as the treated fluid flows vertically through the column, either from top to bottom or bottom to top. The use of a more uniform resin bead can also enhance these desirable hydraulic flow characteristics. Currently, ion exchange apparatus and processing rates are limited by the conventional fluid inlet configurations and media efficiencies, with the fluid required to flow vertically through the column to an outlet. However, for the treatment of highly radioactive waste effluents, maximum utilization of a media capacity may not be desirable because the column changeout frequency will be determined by the total activity in the column, not exhaustion of media capacity. This generally means that at column change out, the media will be exceptionally heterogeneous with media close to the inlet being saturated with the radioactive contaminant while media towards the outlet will effectively be unused. In fact, maximum utilization of media capacity is disadvantageous because it leads to activity concentration within a small area of the column which can cause problems with hydrogen mitigation, temperature control and future storage and disposal. What is needed in the art is a system and method that provides better distribution of treatable fluid through ion exchange media for enhanced processing efficiency, and a robust, mobile or fixed, rapidly deployable, modular-capable system to ensure timely containment and radiation protection. The systems and methods disclosed herein are not limited to nuclear waste applications and may be useful for other applications where a homogenous distribution of an element or compound throughout a solid substrate is required.

SUMMARY

Systems and methods are disclosed herein for ion exchange wherein process fluid is injected at multiple points within the ion exchange vessel simultaneously, allowing the contaminants and/or the contaminated process fluid to be distributed homogenously throughout the ion exchange media. These systems and methods may be implemented in one or more of fixed, mobile, and modular embodiments.

BRIEF DESCRIPTION OF THE DRAWINGS

A more complete understanding of the systems, methods, processes, and apparatuses disclosed herein may be derived by referring to the detailed description when considered in connection with the accompanying illustrative figures. In the figures, like-reference numbers refer to like-elements or acts throughout the figures.

Figure 1:
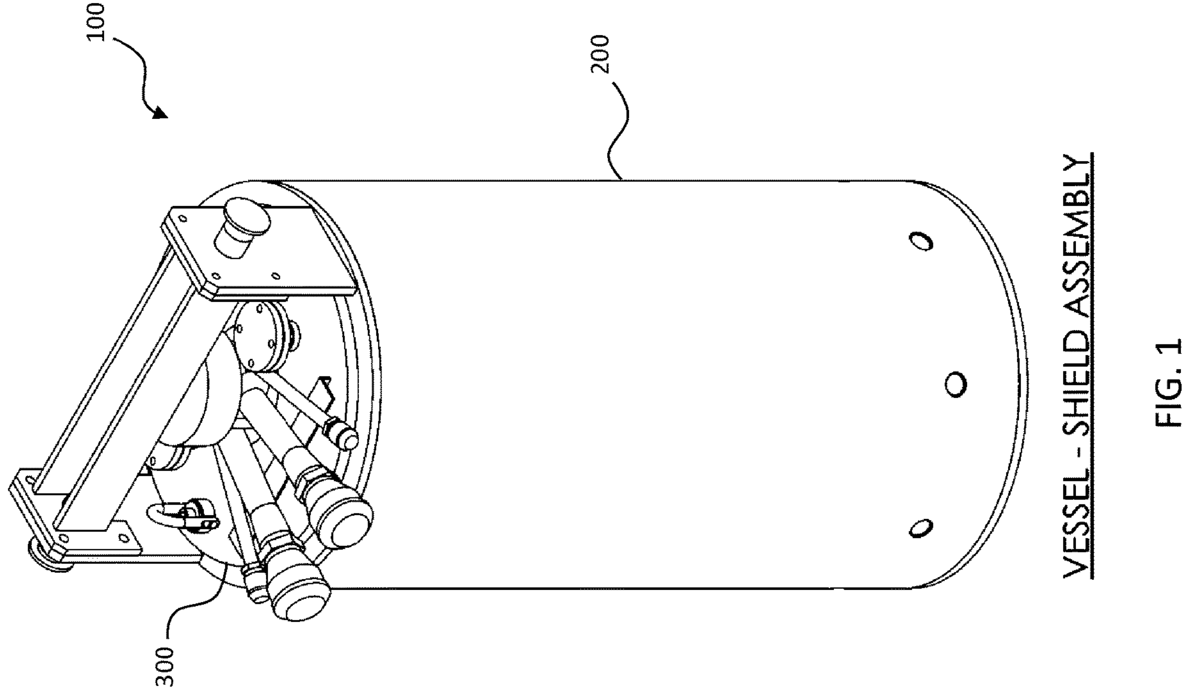
FIG. 1 depicts an embodiment of a complete ion exchange (IX) assembly including a vessel and a shield.

Elements and acts in the figures are illustrated for simplicity and have not necessarily been rendered according to any particular sequence or embodiment.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. It should be noted that there are many different and alternative configurations, devices, and technologies to which the disclosed embodiments may be applied. The full scope of the embodiments is not limited to the examples that are described below.

In the following disclosure, references are made to the accompanying drawings that depict various embodiments for practicing the systems, methods, processes, and/or apparatuses disclosed herein. It is to be understood that other embodiments may be utilized, and that structural and functional changes may be made without departing from the scope of the present disclosure.

Overview

The systems and methods disclosed herein overcome the disadvantages of conventional ion exchange vessel design (referred to herein as standard vessel) in the treatment of highly radioactive wastes and other types of fluids. In standard vessels, contaminated process fluid flows vertically through the vessel from inlet to outlet with a defined, narrow, mass transfer zone. In the systems and methods disclosed herein, the process fluid (also referred to as contaminated water, wastewater, or influent, in some embodiments) is injected at multiple points simultaneously within the ion exchange vessel, allowing the process fluid and/or contaminants in the process fluid to be spread evenly throughout the ion exchange media thus producing a more homogenous distribution of contaminants in the vessel.

An objective of the systems and methods disclosed herein is even distribution of the contaminants in the ion exchange media using an annular vessel as opposed to the conventional approach of seeking maximum utilization of the ion exchange media or sorbents using a standard vessel. This approach allows for better control of heat generation and subsequent cooling measures, particularly with highly radioactive process fluid.

The process fluid entering the annular vessel may be distributed throughout the height of the annular vessel allowing contaminants in the process fluid to be distributed evenly in the media and thus avoiding hot spots. The annular configuration allows for better thermal dissipation through utilization of a natural convection cooling channel in the center, and a natural convection cooling channel between the annular vessel and the shielding.

In some embodiments, adsorbents, absorbents, and sorbents may be used in place of ion exchange media. In a discussion about adsorption and ion exchange, the two chemical processes have subtle differences; however, for purposes of the present disclosure the terms are used interchangeably. While the present disclosure discusses ion exchange embodiments for nuclear waste scenarios, the systems and methods may be useful for any application requiring an ion exchange process.

Vessel Embodiments

FIG. 1 depicts an embodiment of a complete ion exchange (IX) assembly 100 comprising a shield 200 and an annular vessel 300. In some embodiments, the empty vessel 300 may weigh approximately 1640 kg. In some embodiments, the shield 200 may weigh approximately 8829 kg. These listed weights are merely embodiments and other weights for the empty vessel 300 and shield 200 are possible. In some embodiments, the shield 200 and the vessel 300 are cylindrical and the vessel 300 may have a hollow interior. In some embodiments, the shield 200 and the vessel 300 may be an elliptic cylinder having a cross-section of an oval or an ellipse and the vessel 300 may have a hollow interior. The following figures show measurements in millimeters. These measurements are specific to the depicted embodiments and there may be other values for other embodiments.

Figure 2:
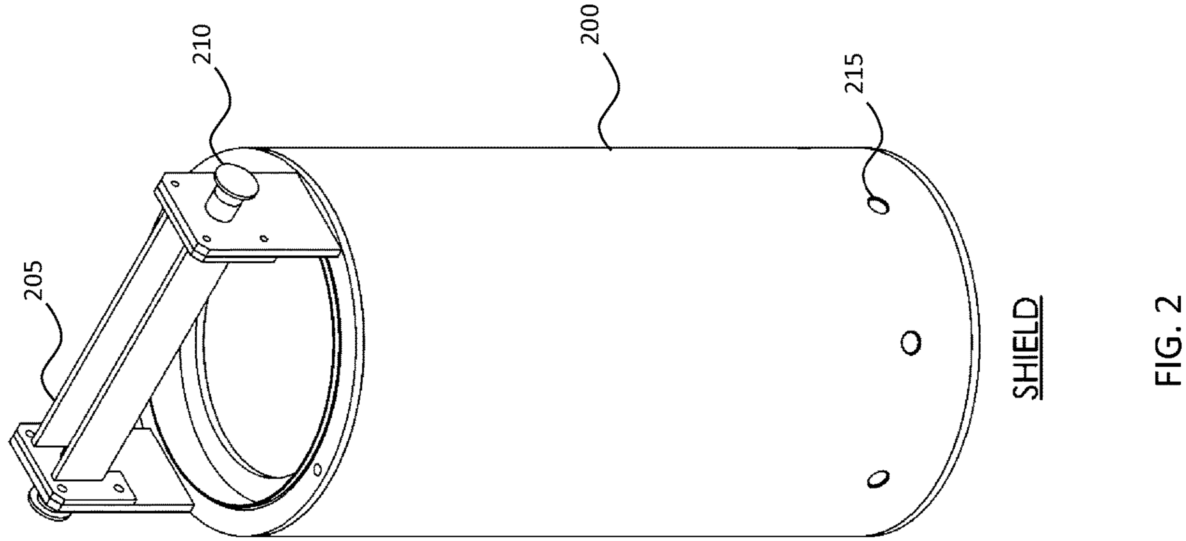
FIG. 2 depicts an embodiment of a shield.
Figure 3:
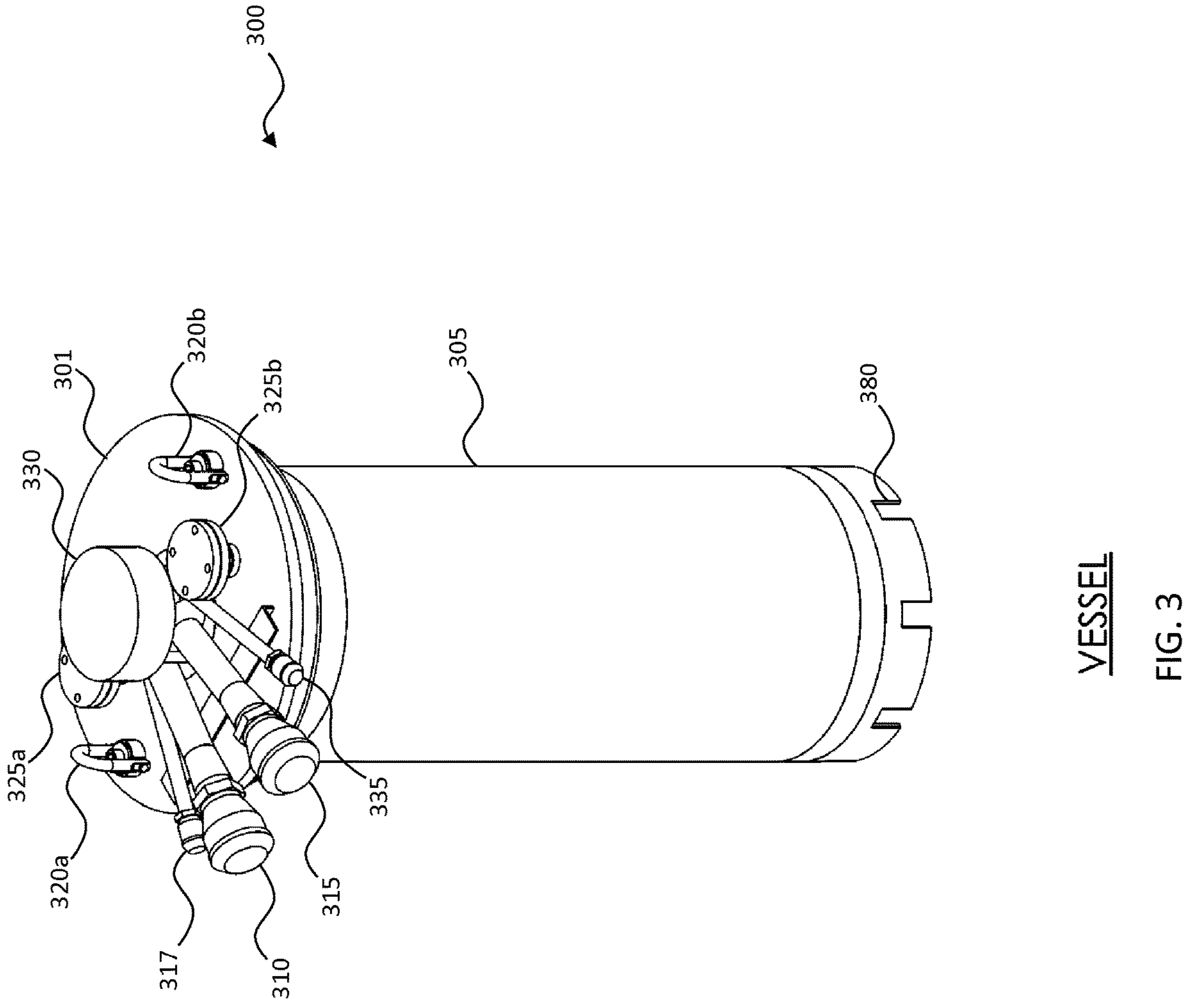
FIG. 3 depicts an embodiment of an annular vessel.

FIG. 2 depicts an embodiment of a shield 200. The shield 200 comprises a lug 205 at the top for lifting on and off of the IX vessel 300 (FIG. 3). Lifting lugs 210 allow the IX assembly 100 (FIG. 1) to rest in position during processing. One or more ventilation inlets 215 may be located around the base of the shield 200. The depicted embodiment comprises at least six equally spaced and sized ventilation inlets 215. In some embodiments, the quantity and spacing of the ventilation inlets 215 may vary from the depicted embodiment. In some embodiments, one or more vents may be equipped with filters, such as micrometric filters, to prevent dust emissions. These filters may be capable of preventing radioactive dust emissions for embodiments that process radioactive process fluid.

In some embodiments, the shield 200 is formed from cast lead metal. Because lead metal possesses specific characteristics that are beneficial for radioactive shielding, it is widely used for a shielding feature when necessary. In some embodiments, other materials (e.g., lead shot, depleted uranium, steel plating, and/or concrete) may be used for shielding during ion exchange processing of radioactive fluids if sufficient material-thickness is used to reduce the surrounding radiation exposure rate to acceptable limits. In some embodiments related to radioactive shielding requirements, the material used for shielding will depend on features such as heat dissipation from the material, resistance to radiation impairment, characteristics during decreased radiation levels, required weight and thickness for the embodied system and method, shielding durability, possibilities for multiuse, industry obtainability, material cost, and physical consistency required for the particular embodiment. In some non-nuclear embodiments, the shield 200 may be used despite the absence of radionuclides in the process fluid. Shielding materials and thicknesses may vary between embodiments. The same essential shield design may be used for standard vessels and annular vessels, in some embodiments.

FIG. 3 depicts an embodiment of an annular vessel 300. The depicted vessel 300 comprises a shell 305 that surrounds the interior components with one or more inner ventilation inlets 380 at its base. The positions of the one or more ventilation inlets 380 in the shell 305 correlate to the one or more ventilation inlets 215 (FIG. 2) in the shield 200 (FIG. 2), in some embodiments. The one or more ventilation inlet channels 380 allow air to enter the inner ventilation channel and the one or more ventilation inlets 215 (FIG. 2) allow air to enter both the inner ventilation channel and the outer ventilation channel between the vessel and the shield, disclosed in more detail below.

Figure 4:
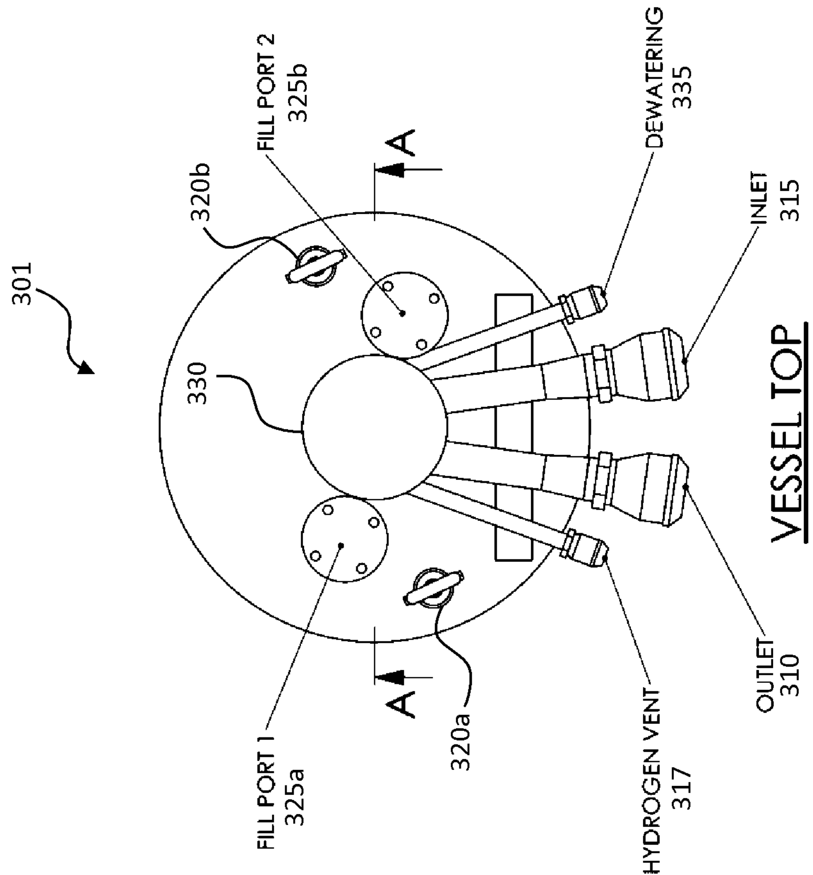
FIG. 4 depicts a top view of an annular vessel embodiment.

FIG. 4 depicts a top view of an annular vessel 300 embodiment. The depicted vessel 300 embodiment comprises an outlet 310, inlet 315, vent 317, inner channel ventilation outlets 320*a,b*, fill ports 325*a,b*, shield cap 330, and dewatering tube 335. The shield cap 330 and the top 301 of the vessel 300 (FIG. 3) may be comprised of cast lead metal, in some embodiments, to provide shielding. Any shielding material capable of providing shielding from radionuclides may be used, with examples including but not limited to steel, depleted uranium, and concrete, or combinations thereof. In some embodiments, the vent 317 may be used to vent hydrogen. In some embodiments, the vent 317 may be used for cooling and dissipating heat, such as heat generated during radioactive decay. In some embodiments, the dewatering tube 335 is used to remove free water once the vessel is exhausted. Free water is essentially process fluid that has been processed by the vessel and may proceed to another vessel or process for further processing or may be "clean" water at the end of a processing regime depending on one or more of the characteristics of the influent and the processing stage in an overall process.

Figure 5:
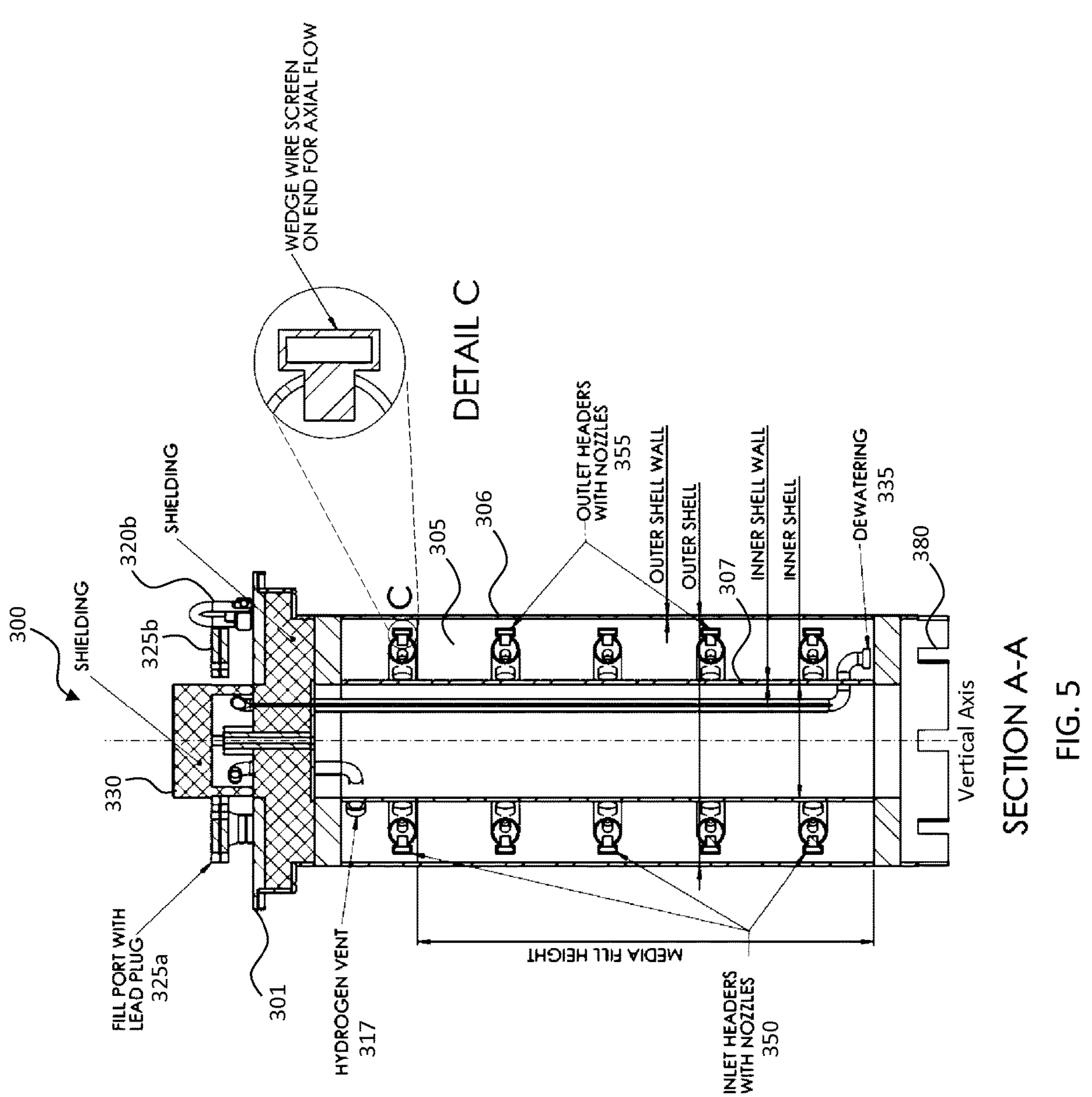
FIG. 5 depicts section A-A view of the embodiment of FIG. 4.

FIG. 5 depicts section A-A view of the embodiment of FIG. 4. Section A-A is a vertical cross-section down the length of the vessel 300. In some embodiments, fill ports 325*a,b* in the top 301 of the vessel 300 allow for the addition of ion exchange media. The fill ports 325*a,b* may be fitted with plugs to shield the process during use. The plugs may be composed of lead metal, in some embodiments, or any material capable of providing shielding from radionuclides. The shield cap 330 covers and shields the inlet 315 (FIGS. 3 and 4), outlet 310 (FIGS. 3 and 4), vent 317, and dewatering tube 335. The shell 305 surrounds the interior components and provides some additional shielding. In some embodiments, the interior diameter of the vent 317 is 25 mm. In some embodiments, the inner shell 307 and outer shell 306 walls are 10 mm thick, the outer diameter of the outer shell 306 is 660 mm, and the inner diameter of the inner shell 307 is 300 mm. In some embodiments, other measurements may be used for the vent 317, the outer shell 306 walls, the outer diameter of the outer shell 306, and the inner diameter of the inner shell 307. A vertical axis is defined centrally through the vessel 300.

In the depicted embodiment, located between the inner shell 307 and outer shell 306, are two or more evenly distributed (vertically and radially) inlet and outlet headers 350 and 355, respectively. The headers 350 and 355 are ring-shaped, in some embodiments, with nozzles evenly distributed on at least one of the interior and exterior of the ring. The headers 350 and 355, with nozzles, serve to homogenously distribute process fluid into the ion exchange media contained within the vessel 300. In some embodiments, as depicted in Detail C, the one or more inlet and/or outlet nozzles may comprise wedge wire screens on the ends for axial flows. In the depicted embodiment, five headers 350 and 355 are evenly distributed along the height of the interior of the vessel 300 with three inlet headers 350 and two outlet headers 355 alternating. In some embodiments, the media fill height is 1200 mm which allows for a total volume of 0.3 $m^3$. In some embodiments, other measurements and volumes may be used.

Figure 6:
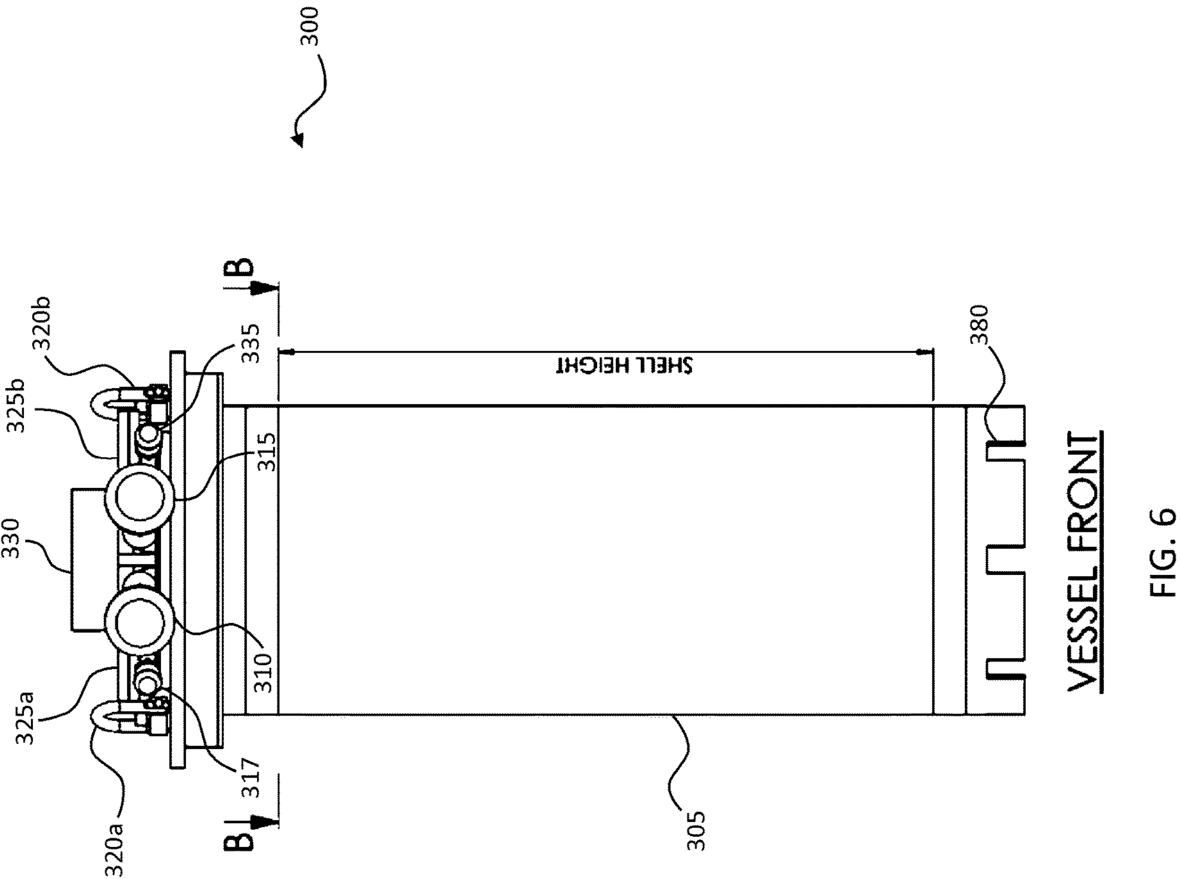
FIG. 6 depicts a front view of an annular vessel embodiment.
Figure 7:
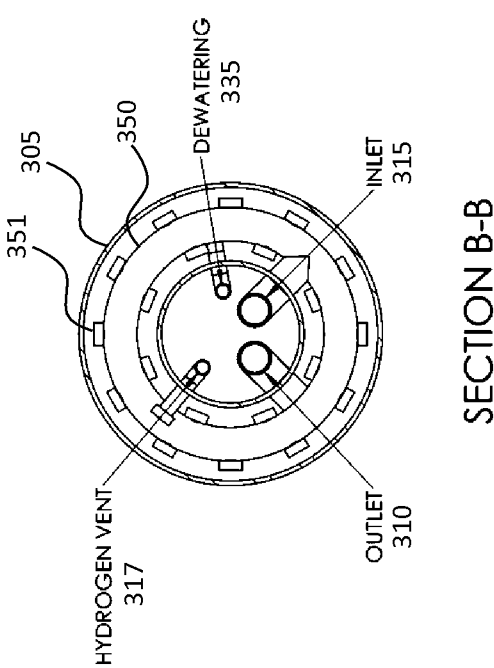
FIG. 7 depicts section B-B view of the embodiment of FIG. 6.

FIG. 6 depicts a front view of an annular vessel 300 embodiment. In some embodiments, the shell 305 height is 1400 mm. In some embodiments, other measurements may be used. Cross-section B-B cuts horizontally across the vessel 300. FIG. 7 depicts section B-B view of the embodiment of FIG. 6. In the depicted embodiment, there are twelve evenly distributed inlet nozzles 351 on the exterior of the inlet header 350 and eight evenly distributed inlet nozzles 351 on the interior of inner header 350. As noted in the description of FIG. 5, in some embodiments, inlet headers 350 and outlet headers 355 (FIG. 5) may alternate along the length of the vessel 300 (FIG. 5). Other configurations are possible.

Figure 8:
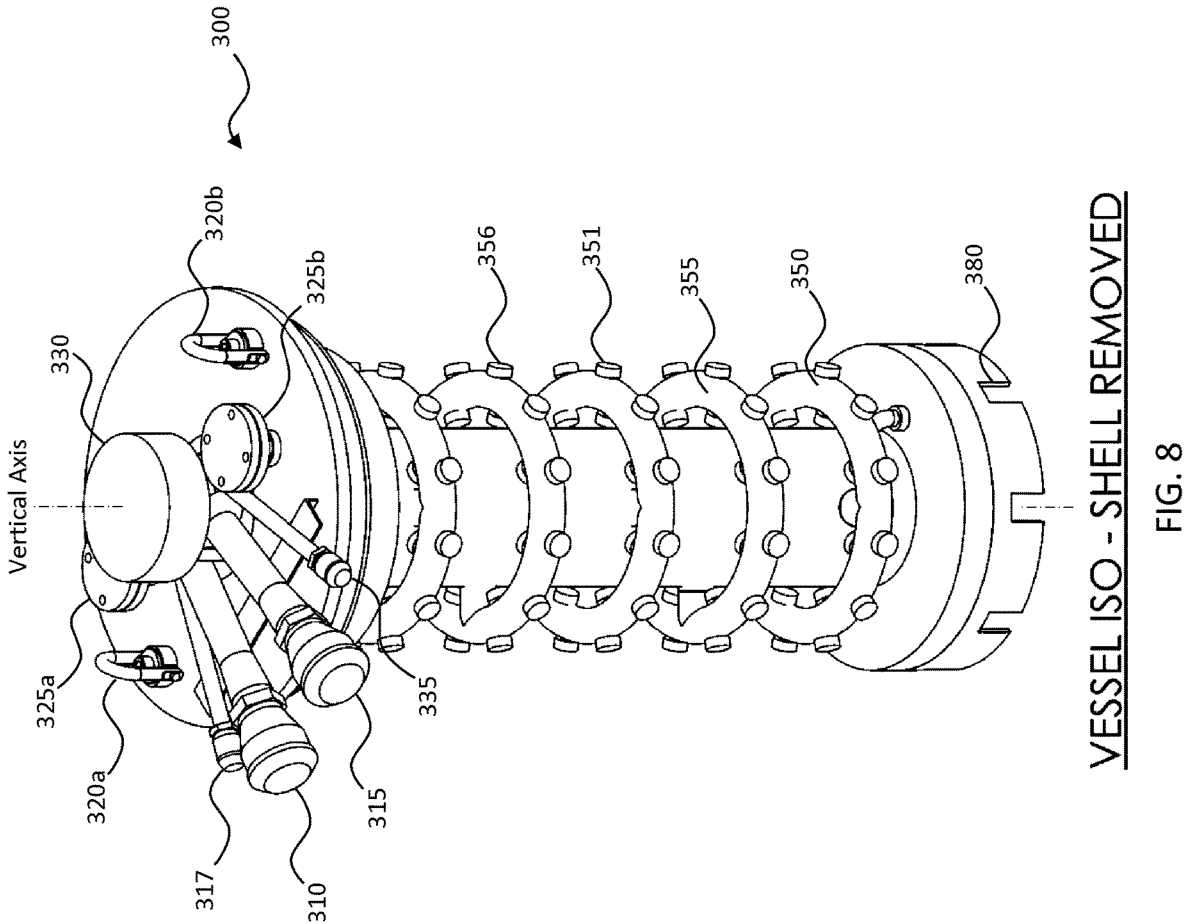
FIG. 8 depicts an isometric view of an annular vessel embodiment with the shell removed.

FIG. 8 depicts an isometric view of an annular vessel 300 embodiment with the shell 305 (FIG. 3) removed to show the interior components more clearly. The depicted embodiment displays the alternating inlet headers 350 with nozzles 351 and outlet headers 355 with nozzles 356 as described in FIG. 7. A vertical axis is defined centrally through the vessel 300.

Figure 9:
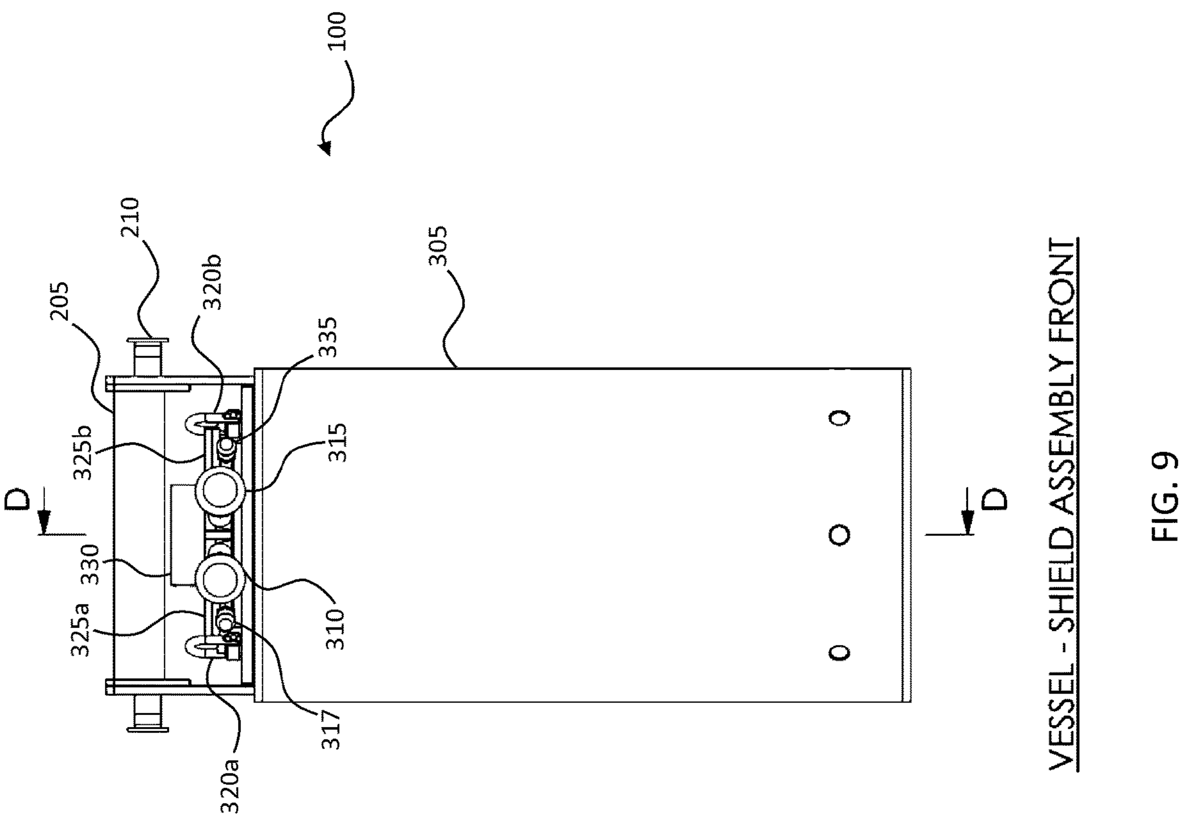
FIG. 9 depicts a front view of an IX assembly embodiment.
Figure 10:
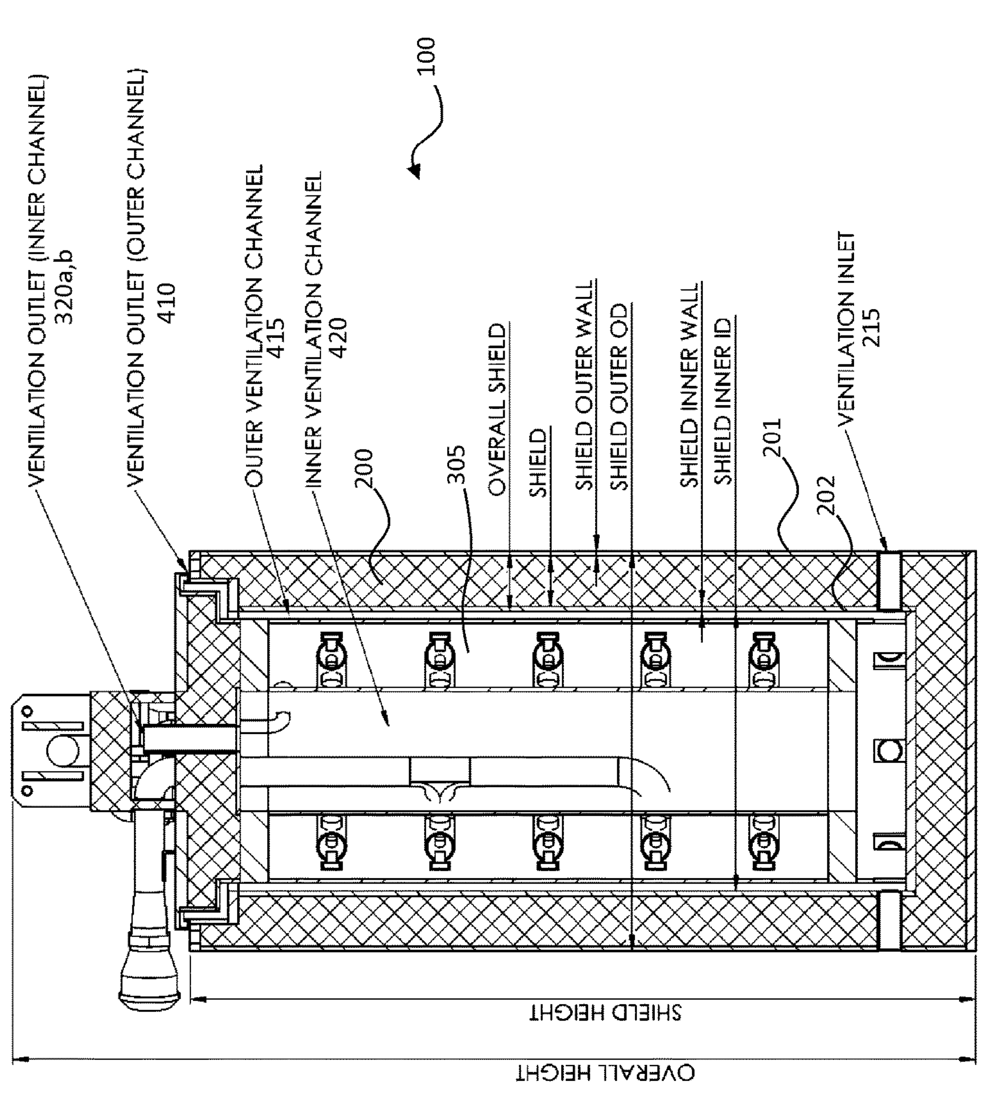
FIG. 10 depicts section D-D view of the embodiment of FIG. 9.

FIG. 9 depicts a front view of an IX assembly 100. Section D-D cuts vertically down the center of the IX assembly 100. FIG. 10 depicts section D-D view of the embodiment of FIG. 9. In the depicted embodiment, the IX assembly 100 comprises an annular vessel 300 (FIG. 6). In some embodiments, the overall height of IX assembly 100 is 2407 mm. In some embodiments, the shield 200 measurements are as follows: the height is 1965 mm, overall thickness is 150 mm, thickness between walls is 126 mm, outer wall 201 thickness is 12 mm, inner wall 202 thickness is 12 mm, outer diameter of the outer wall 201 is 1000 mm, and the inner diameter of the inner wall 202 is 700 mm. These measurements may vary in other embodiments. In the depicted embodiment, an outer ventilation channel 415 is situated between the inner wall 202 of the shield 200 and the shell 305 which connects one or more ventilation inlets 215 from the base to the outer channel ventilation outlet 410 at the top. The inner ventilation channel 420 is located in the interior of the IX assembly 100 and vents to ventilation outlets 320*a,b* at the top of the IX assembly 100, in the depicted embodiment.

Figure 11:
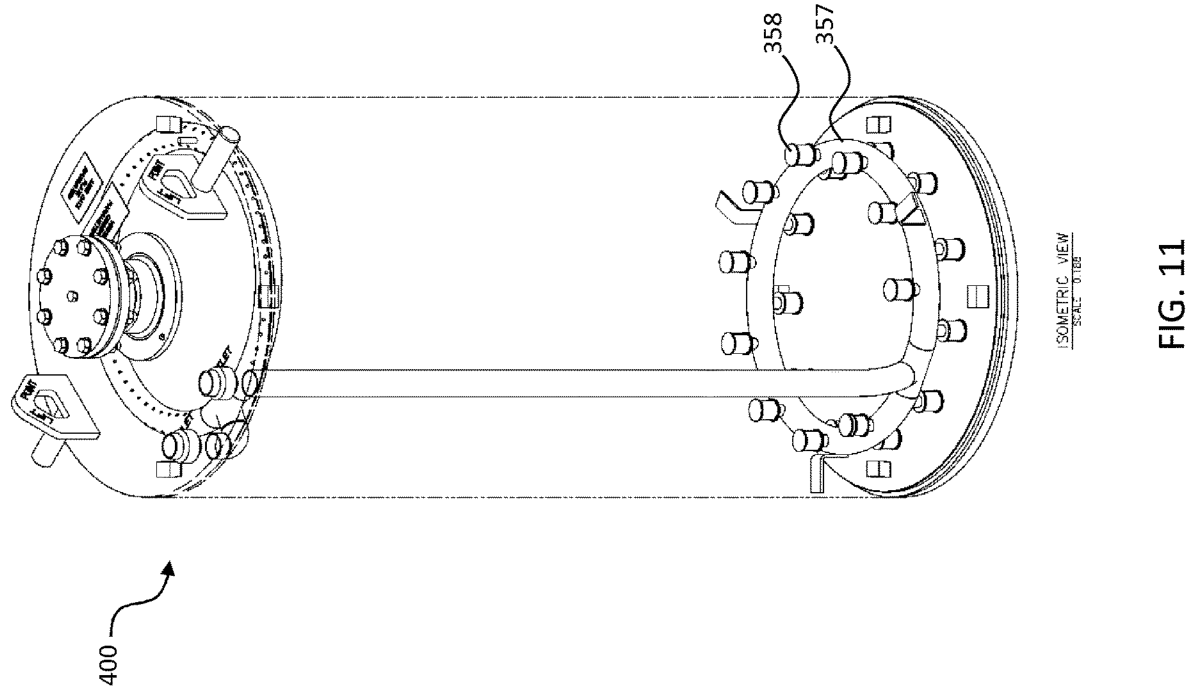
FIG. 11 depicts an embodiment of a standard vessel.

FIG. 11 depicts an embodiment of a standard vessel 400. Standard vessels are known in the art. The depicted embodiment comprises similar outer componentry to the annular vessel. The interior of the standard vessel 400 does not include a ventilation channel. The depicted standard vessel 400 comprises a single header 357 with nozzles 358 located near the base of the vessel 400. In the depicted embodiment, the nozzles 358 are oriented vertically. These vessels 400 may be filled with sorbents or with one or more filters, tube filters, or filter materials. In some embodiments, standard vessels 400 may be preferred when risk of hot spots is reduced or eliminated, for instance when activity of the process fluid is low or negligible. In some embodiments, annular vessels and standard vessels may be implemented in the same process at different stages in the process.

In some embodiments, a standard vessel 400 (FIG. 10) or annular vessel 300 (FIG. 5) may be filled with one or more filters rather than ion exchange media. These types of vessels are referred to as filter vessels. In some embodiments, the annular zone of an annular filter vessel may comprise a beam of tubular microfilters. In such an embodiment, the process fluid may be supplied through the top of the tubes. In some embodiments, filter materials may comprise non-radiosensitive metal or ceramic materials.

Configuration and Sizing

Ion exchange vessels (or columns) may be scalable. Table 1, below, shows some sizing degrees of freedom and their potential impacts, in some embodiments:

TABLE 1

Design Settings and their Effects

| Vessel Setting | Impacts |
|---|---|
| Configuration: Standard or Annular | Standard vessels have a greater adsorption capacity while annular vessels generally ensure a better dissipation of heat. |
| Diameter | A larger diameter reduces the number of vessels needed in the long term but at the expense of handling of the vessels and the compactness of the treatment device, in some embodiments. |
| Height | Increased height increases the volume and payload of the constant footprint vessel, but at the expense of handling and gas evacuation, in some embodiments. Increased height may also result in increased pressure drop across the vessel which can have a negative impact, e.g., require booster pumps to maintain flow. |
| Loading in Activity | Greater loading per unit of volume reduces the number of vessels needed, but may be limited by one or more of dose flow, temperature, and gas generation constraints, in some embodiments. |
| Sorbent Materials | In general, materials (inorganics, especially ceramics) with the highest sorbent capacities and/or selectivities may be used in order to minimize the number of vessels needed in the long term. However, other technical constraints (chemical and mechanical resistance) and economic constraints (sorbent prices) may also be considered. |

In some embodiments, configuration, size, and radioactive loading of vessels may be a trade-off between one or more of dose flow, temperature, radiolytic gas management, operability (vessel handling), clutter (footprint), storage (total number of used vessels), and long-term waste packaging (filtering materials). Vessel size and configuration may vary depending on the characteristics of the process fluid, as well as other site factors such as throughput requirements, footprint, and other factors.

Radioactive Applications

Some embodiments of the systems and methods disclosed herein may be used to process radioactive waste fluids. With known in the art ion exchange vessel configurations (standard vessels), as a process fluid containing radioactive isotopes is passed through the vessel, the radioactivity concentrates at the influent and slowly progresses down (or up) the vessel as the ion exchange sites become saturated on the ion exchange media. When treating highly radioactive wastes, the activity limit for the vessel would be reached quickly and the majority of the absorbed radioactivity would be concentrated very close to the input to the vessel with very little, if any, activity on the bulk of the ion exchange media. Thus, the spent vessel would be heterogeneous, complicating both hydrogen remediation and developing localized thermal heating, compromising the safe storage and handling of the spent ion exchange media.

In applications for processing highly radioactive waste fluids, it is typically not desired to maximize ion exchange media capacity because the amount of waste fluid that can be treated by an ion exchange vessel generally does not depend upon ion exchange media capacity but on the total amount of radioactivity concentrated in the vessel. The amount of activity that can be safely captured is limited due to a combination of the heat generation from the radioactive decay and hydrogen generated due to radiolysis of water within the ion exchange media. To have efficient cooling and afford adequate hydrogen remediation, it is essential that a more homogeneous distribution of the activity is obtained and that there are no 'hot spots' within the ion exchange vessel where activity is concentrated. Hot spots could severely compromise the safety and handling of the spent ion exchange vessel, and may compromise the shielding, thereby leading to dose rates higher than conventional safety limitations at certain locations. The annular vessel systems and methods disclosed herein reduce/eliminate these concerns through increased heat dissipation and homogenous loading.

For treatment processes involving radioactive contaminants, additional shielding and leak prevention measures may be incorporated into the apparatus to prevent release of contaminants to the environment and to protect the environment and personnel in the event of a breach. For instance, in modular embodiments, process lines between modules may include secondary containment and leak detection systems. Process modules may include additional shielding, redundant valves and instrumentation, leak detection systems, emergency shutdown, and hydrogen/flammable gas venting systems.

Other Process Applications

Homogeneous distribution of a contaminant throughout an ion exchange resin, adsorbent, or other granular material (ion exchange media) may be utilized in a variety of applications. Homogeneity and heterogeneity (homogenous and heterogenous) are known concepts used in chemistry relating to the uniformity of a substance in a space or vessel. A material that is homogeneous is uniform in composition or character (i.e., color, shape, size, weight, height, distribution, texture, temperature, radioactivity, etc.); a material that is heterogeneous is distinctly nonuniform in one (or more) of these qualities.

An example application may be the homogeneous loading of a catalytic metal (e.g., platinum, nickel, etc.) throughout a zeolite or other substrate. This is normally performed using a batch operation where the substrate is physically mixed with a solution of the catalyst, the fluid drained, and then the final product dewatered. The application of the systems and methods disclosed herein could allow this manufacturing process to be performed in a smaller vessel in a shorter time period with fewer mechanical operations (e.g., no mixing operation). Eliminating mixing would also minimize product attrition, reducing waste, and eliminating the need for washing to remove fines that may have been generated.

Vessel Types by Fill

The types of vessels listed below are merely examples are not intended to be limiting. Vessels may be loaded with any conceivable ion exchange media or filter material. The characteristics of the process fluid and/or the targeted isotope(s) in the process fluid may dictate type(s) of ion exchange material or filter material, how many vessel(s) may be needed, order of processing, and layout (series/parallel) for a particular process.

As an ion exchange vessel may be filled with any type of sorbent or ion exchange media, the IX system is operable to remove a number of different contaminants when using two or more vessels with different sorbents or ion exchange media in series. In some embodiments, one or more vessels may be used in series and/or in parallel with one or more solids removal filters, ultrafilters, and/or other filtration systems. In addition, in some embodiments, process fluid may proceed through pretreatment such as reverse osmosis before being processed through one or more vessels in series and/or in parallel.

Figure 12:
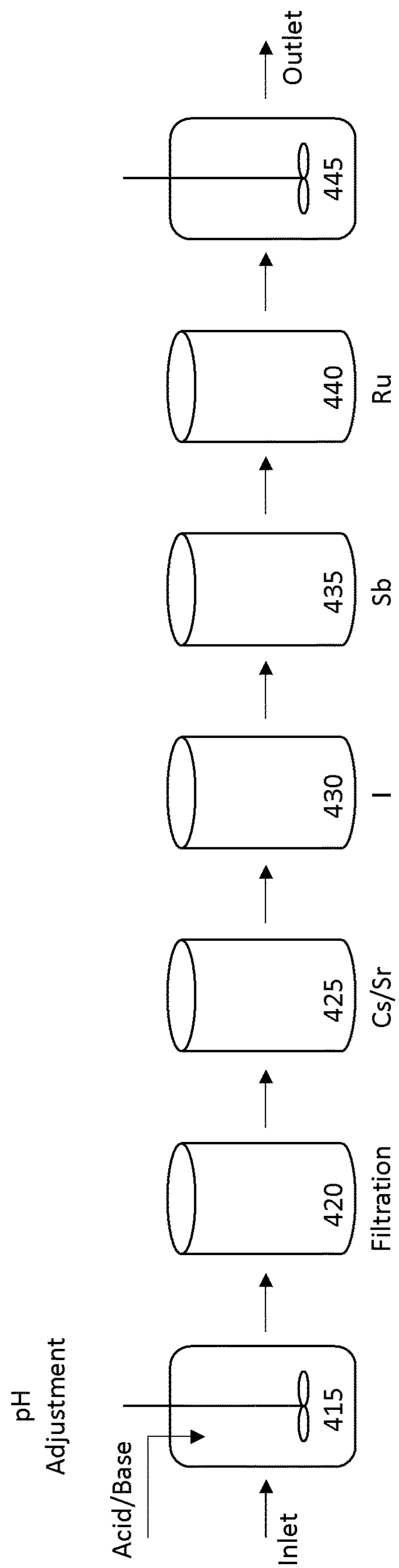
FIG. 12 depicts an example process embodiment using vessels of different types (by fill) in series.

FIG. 12 depicts an example embodiment wherein vessels may be used in series. In the depicted embodiment, each of the vessels is operable to capture different specific element(s). In the depicted embodiment, process fluid may optionally be pH adjusted in tank 415 using a base or acid in some embodiments. pH may be adjusted over a wide range to maximize isotope removal for a particular process fluid. In some embodiments, one or more sorbents may operate optimally in a pH between 6 and 8. The process fluid may then proceed through one or more filtration steps 420, then through Cs/Sr IX 425, IIX 430, Sb IX 435, and Ru IX 440. In some embodiments, the process fluid may proceed through tank 445 for final chemical adjustments before proceeding out of the process.

Number of Vessels

The number and type of vessels used for a process is dependent upon several factors including the properties (such as temperature, water chemistry, concentration and type of contaminants, volume, etc.) of the process fluid, overall activity to be purified, decay time, and average radiological loading per vessel, among other site-specific factors such as footprint, process implementation timeline, and necessary throughput.

The number of vessels needed may also be affected by the implementation timeline for a site. Over time, radioelements decay so if the process is started later, overall activity of the process fluid may be decreased resulting in fewer vessels needed.

The use or number of filter vessels (or cartridges) may vary based on one or more of the overall particulate activity in the process fluid, types of filters, and the maximum decay heat (driven by activity accumulation) per filter vessel. The attainable particulate decontamination factor may depend on the particle size distribution and cut-off thresholds of the available filters.

Fixed, Mobile, and/or Modular Systems

The systems and methods disclosed herein may be implemented in one or more of fixed, mobile, and modular configurations. Fixed configurations are configurations wherein one or more vessels are located and fixed in position on site. Mobile configurations are configurations in which one or more vessels are configured in a mobile container, on a trailer, or otherwise movable around the site or from one site to another. Modular configurations are configurations in which one or more vessels are configured in a modular "plug and play" configuration for simpler transport and setup. A site may utilize more than one configuration type for a single project.

Modularity and mobility are key aspects for effective, efficient, flexible, deployable water treatment systems especially in response to accidents such as Fukushima. Containing one or more processes, including the IX system, within one or more separate modules allows for adaptability and better treatment customization—allowing only the necessary modules to be transported and brought on-site thus reducing shipping, setup, process costs, and time. At any time, modules may be added or removed allowing for a phased approach to site cleanup/processing. Example module containers are ISO shipping containers, which are highly mobile and widely used standardized containers that can be quickly and easily transported to sites around the world, as needed, on existing infrastructure including truck, rail, ship, plane, and other conventional industrial transportation mediums. Standard shipping sizes allow easy stacking for simple, cost-effective transport; however, other shapes and sizes are possible including trailer mounted configurations, drivable configurations, and custom-sized configurations. Modularity also allows for simpler setup, as modules may be set up in any configuration as required by the topography of the region, including stacking. Modularity also allows for easy replacement or simple phase out for maintenance. Each module may be equipped with standard sized quick disconnects for fast and simple connection/disconnection between any modules in any configuration. Modules may be operated in series, parallel, or combinations thereof. Parallel operation allows larger quantities of process fluids to be processed.

The systems and methods disclosed herein may be operated in combination with the systems and methods disclosed in U.S. Pat. No. 9,981,868 (U.S. patent application Ser. No. 14/748,535), titled "Mobile Processing System for Hazardous and Radioactive Isotope Removal," Ser. No. 14/748,535 filed on Jun. 24, 2015, with a priority date of Jun. 24, 2014 issued on 29 May 2018, which is herein incorporated by reference in its entirety, with relevant portions reproduced herein with some modification.

Figure 13:
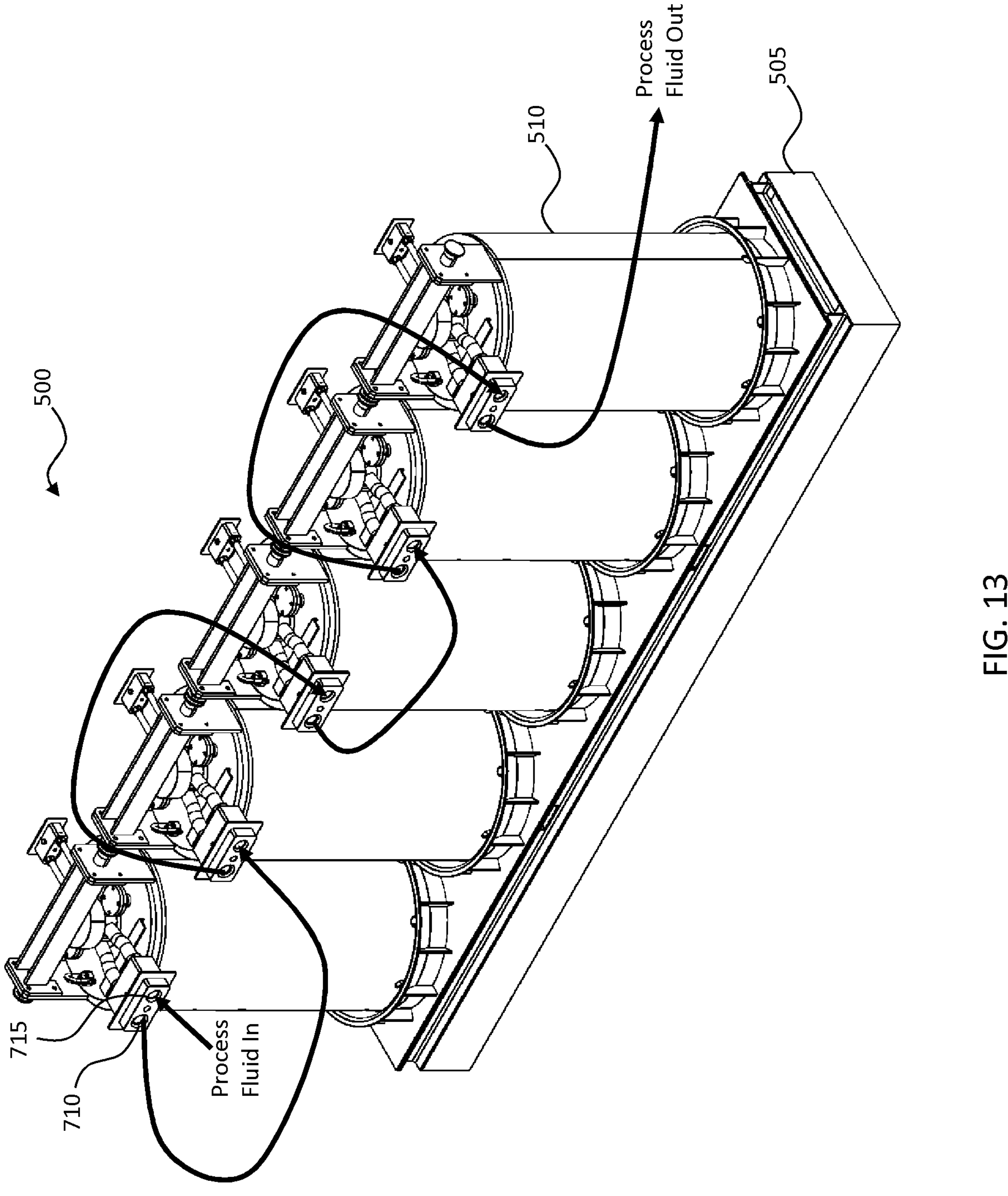
FIG. 13 depicts an example modular embodiment on a linear train of vessels.

FIG. 13 depicts an example of a modular linear train of vessels 500. Each vessel 510 sits in a secure position on the base 505. In the depicted embodiment, the base is sized to accommodate five vessels 510 in a single linear train; however, other embodiments having more or fewer vessels 510 are possible. One or more of the vessels 510 may be standard vessels. One or more of the vessels 510 may be annular vessels. Each vessel 510 may be filled with a different ion exchange media or filter, or one or more vessels 510 may contain the same ion exchange media or filter. In the depicted embodiment, process fluid may proceed through the vessels 510 in series entering each vessel inlet 715 and exiting via the vessel outlet 710.

Figure 14:
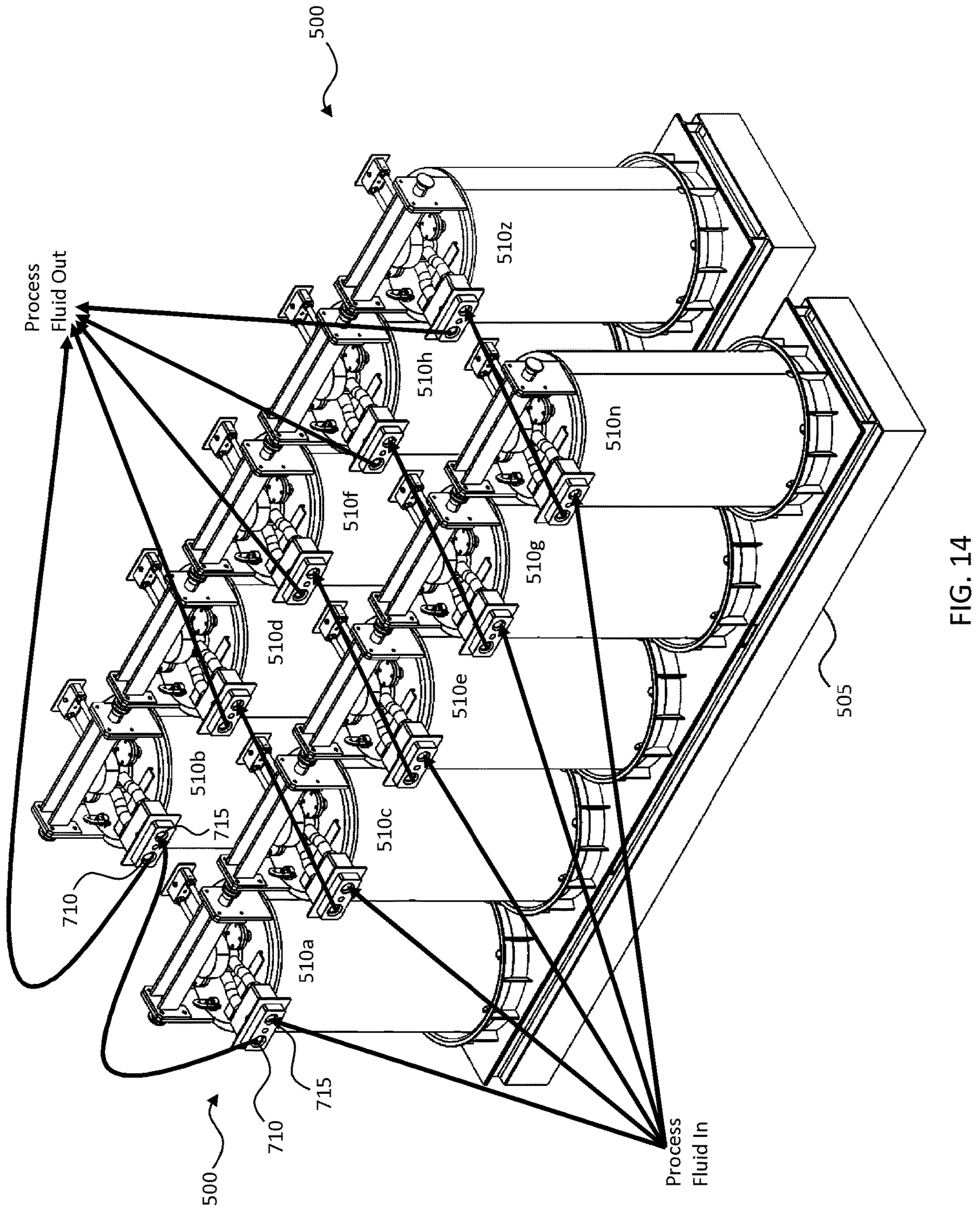
FIG. 14 depicts an example embodiment wherein the vessels of two FIG. 13 modules operate in parallel.
Figure 15:
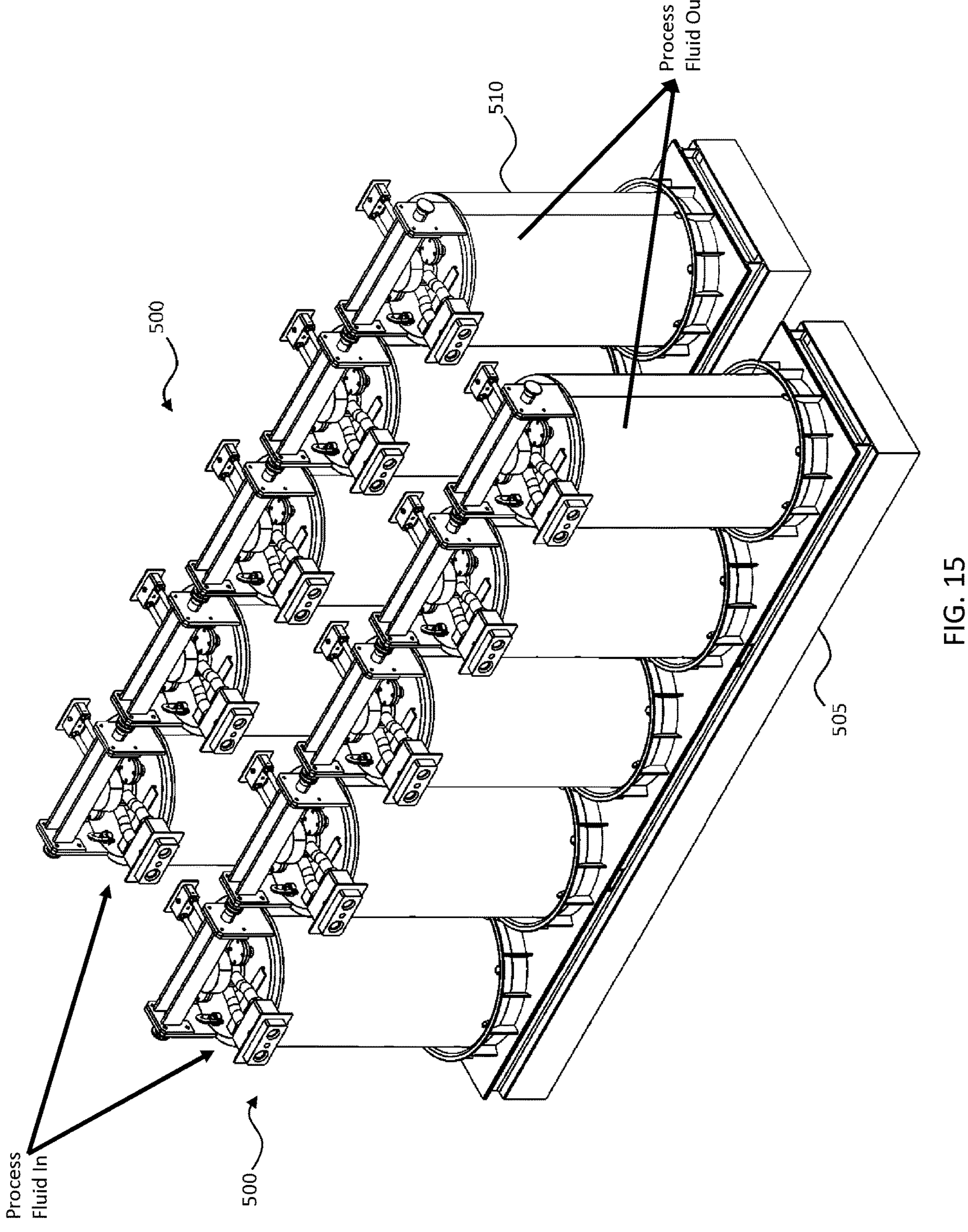
FIG. 15 depicts an example embodiment wherein two FIG. 13 modules operate in parallel.

In some embodiments, processing may occur in parallel between one or more trains, as depicted in FIG. 14. The flow of process fluid is shown entering inlet 715 on vessel 510*a*, leaving via outlet 710 on vessel 510*a*, entering vessel 510*b* via inlet 715, and exiting vessel 510*b* via outlet 710. The remainder of the process flow between the two trains occurs in the same fashion between vessels 510*c* and 510*d*, vessels 510*e* and 510*f*, vessels 510*g* and 510*h*, and vessels 510*n* and 510*z*. While the depicted embodiment shows five vessels 510 on each train 500, more or fewer vessels are possible. In some embodiments, one or more trains may be operated in parallel as depicted in FIG. 15. In some embodiments, one or more trains may be operated in series, as depicted in FIG.

Figure 16:
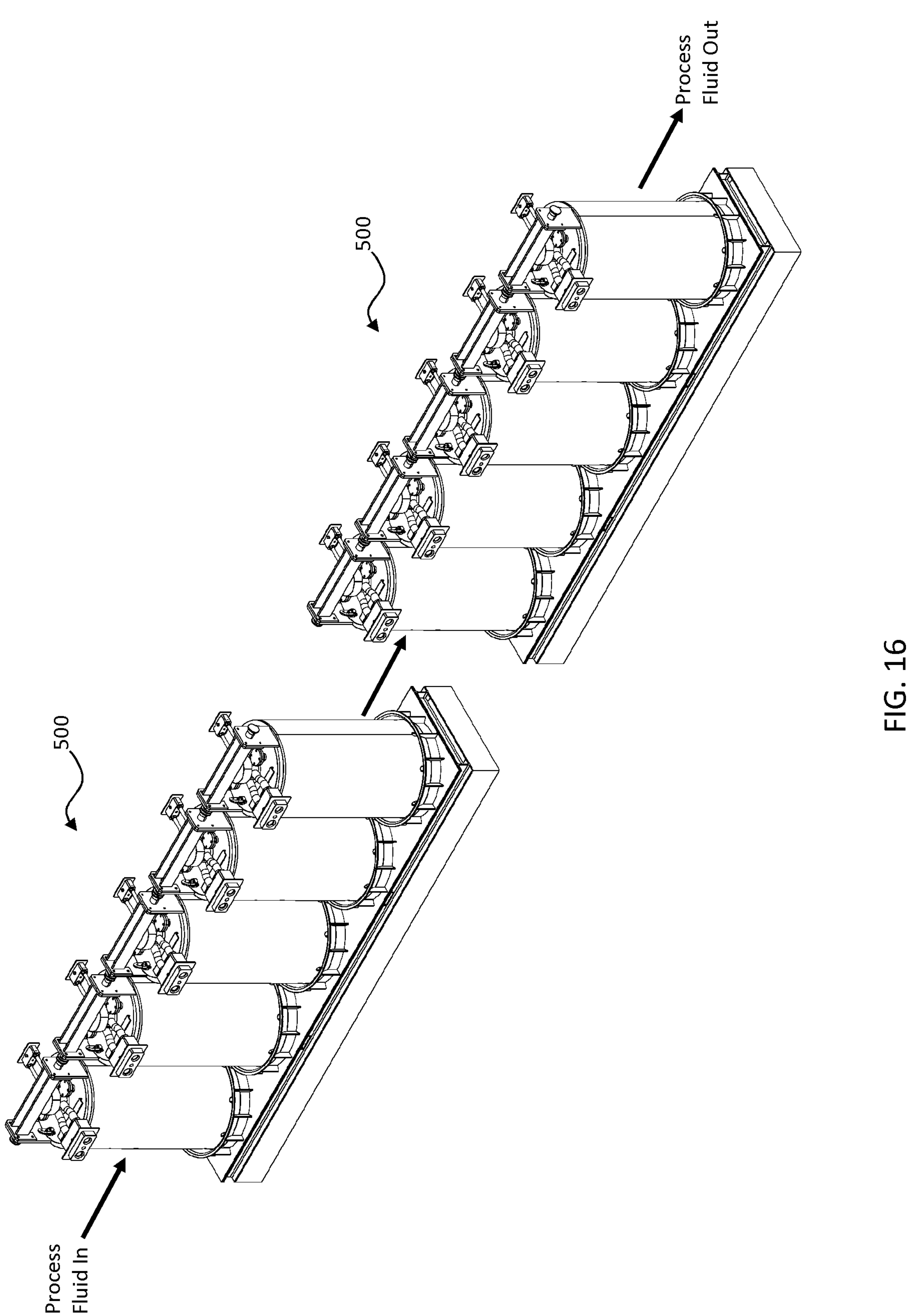
FIG. 16 depicts an example embodiment wherein two FIG. 13 modules operate in series.

16. Flow is depicted generically for clarity in FIGS. 15 and 16 but would proceed through inlets and outlets similar to FIG. 13. In some embodiments, process fluid may flow between one or more trains 500 with one or more of different lengths, vessel quantities, vessel sizes, and vessel types.

Figure 17:
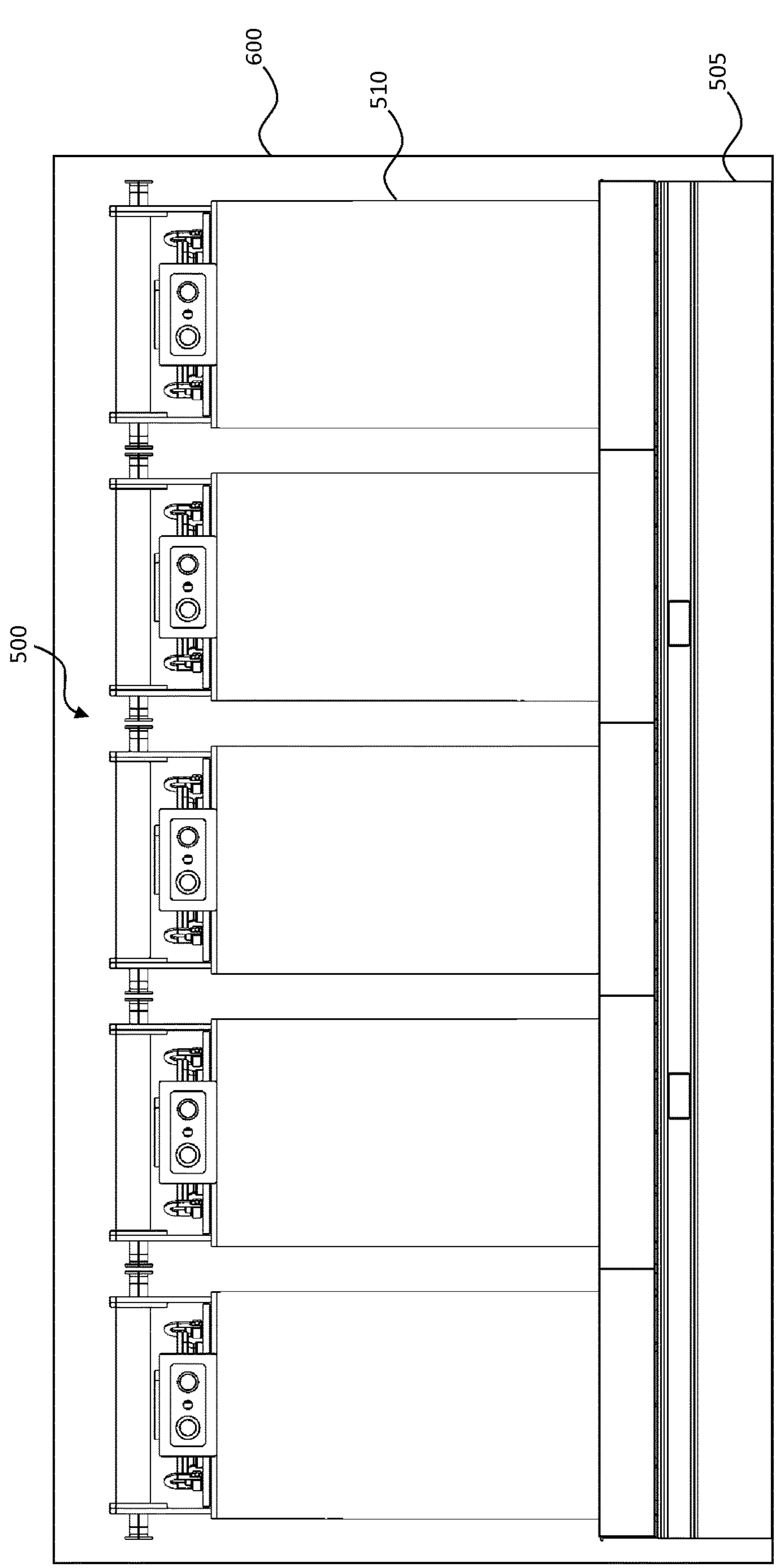
FIG. 17 depicts a front view of an example mobile embodiment.
Figure 18:
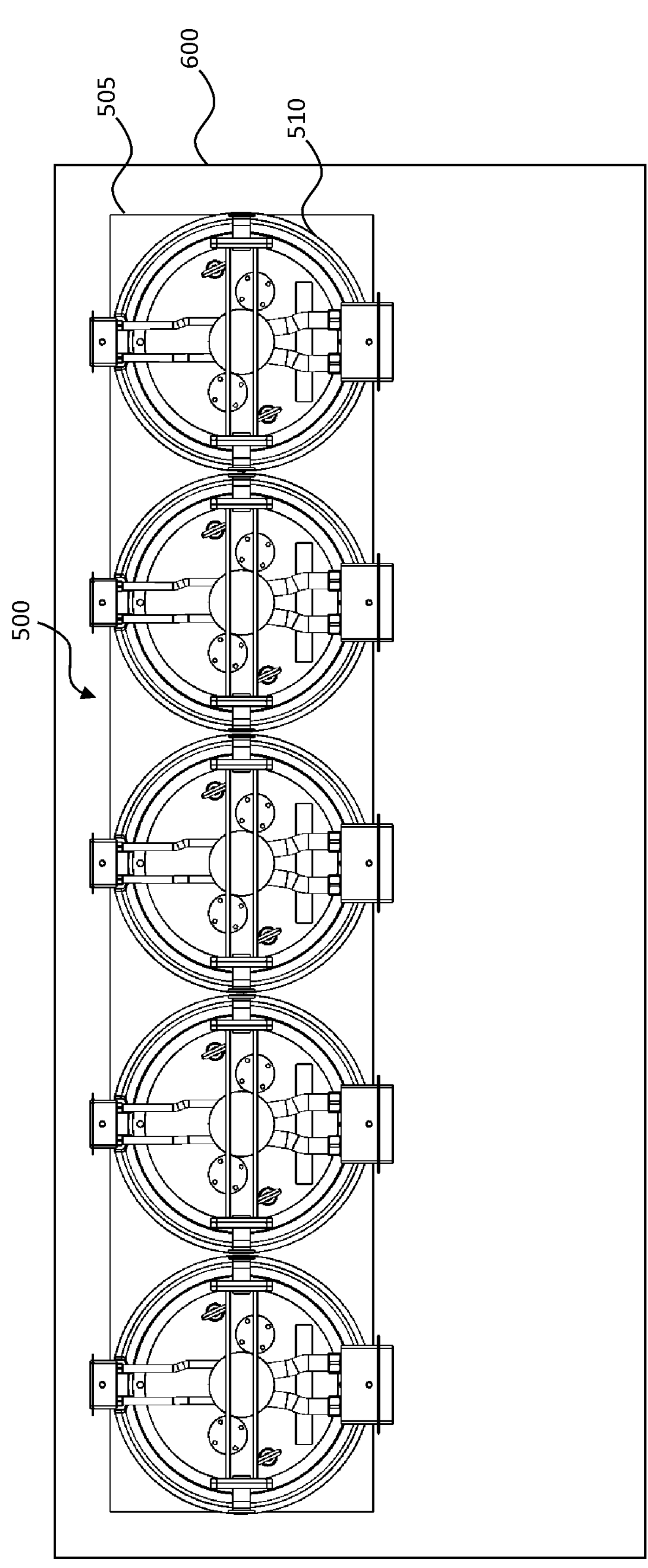
FIG. 18 depicts a top view of an example mobile embodiment.

FIGS. 17 and 18 depict front and top views, respectively, of the embodiment of FIG. 13 in a mobile container 600. Mobility, modularity, and scalability of the vessels allows for a plethora of processing capabilities and configurations. For instance, modules may comprise one or more vessels or types of vessels, and varying numbers of modules may be mobilized in a single container, skid, or other mobile means.

Hydrogen Management and Cooling

It is important to note that the source for hydrogen generation in vessels is water, which will be present in diminishing quantities as radiolysis occurs and water is driven off due to radiolytic heating. This means that risks due to hydrogen generation tend to reduce over the course of the process and, in some embodiments, may be negligible at the conclusion of the process when the vessel and/or the vessel contents are prepared and transported into storage.

Hydrogen buildup occurs during processing and storage. During processing, if process fluid is flowing, hydrogen will be swept out of the vessel with the process fluid. If the process stops for any reason, the hydrogen will need to be vented through the vent path defined on the vessel to an appropriate system (recombiner, dilution, and release, described in more detail, below).

During storage of spent, dewatered vessels, hydrogen will be diluted and vented (in some embodiments) using natural convection. Natural convection is driven mainly by density differences between the emitted gas and ambient air due to hydrogen generation and decay heat.

Figure 19:
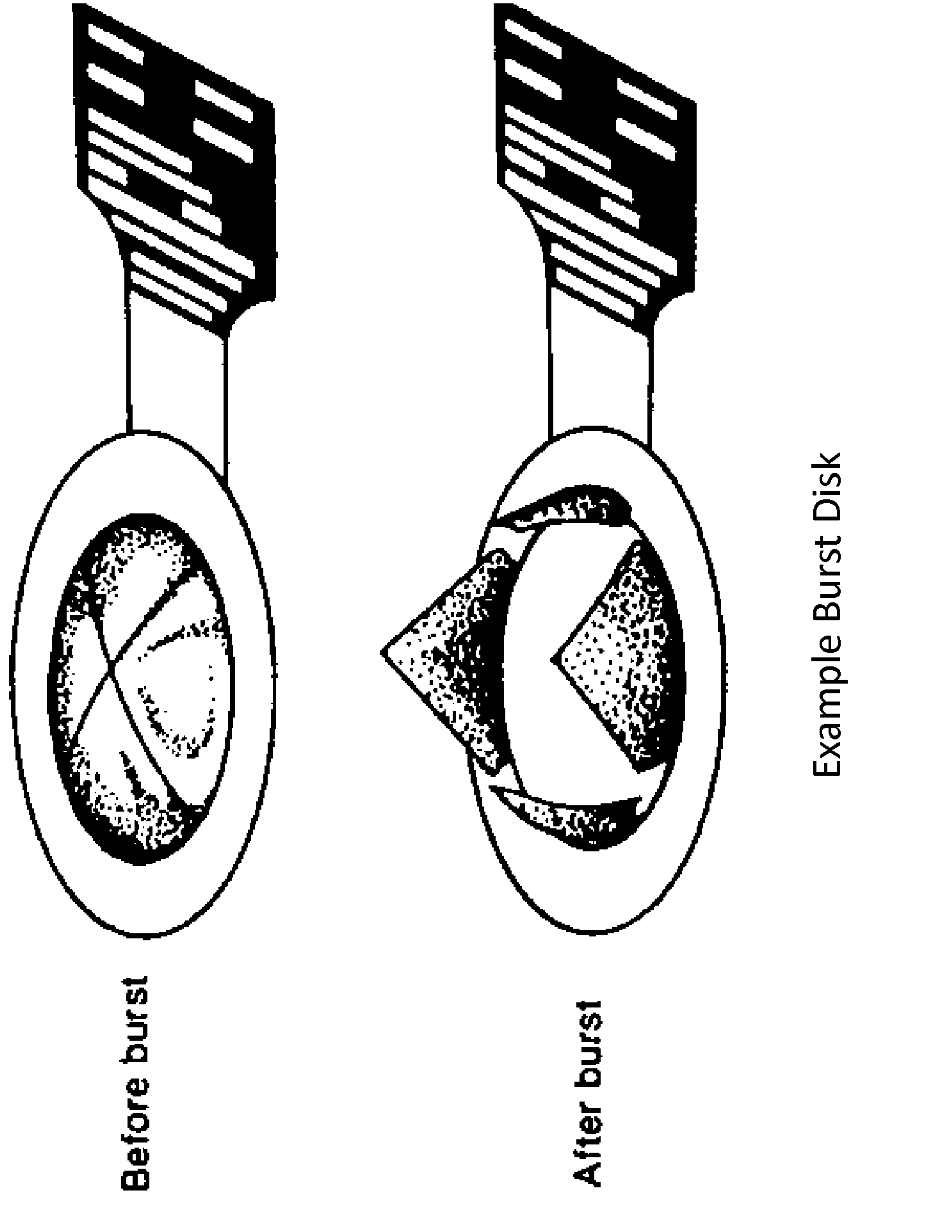
FIG. 19 depicts an example burst disk.

In some embodiments, a burst disk may be added to the vessel prior to transportation. Burst disks are also known as rupture disks, pressure safety discs, bursting discs, or burst diaphragms. These devices act as one-time-use pressure relief safety valves that protect the system from over-pressurization or vacuum conditions. A burst disk is designed to fail at a predetermined pressure. Some advantages of burst disks, as opposed to pressure relief valves, include leak-tightness, reduced cost, response time, size constraints, and ease of maintenance. FIG. 19 depicts an example burst disk.

In some embodiments, when a vessel is taken out of service, the contents are dewatered, and it is placed into storage. In storage, hydrogen released from water radiolysis is naturally diluted and vented from the vessel to the atmosphere using natural convection. The principles of natural convection are based on utilizing low pressure differentials therefore including a filter/screen with higher resistance may diminish the ability to naturally vent below any flammability limit. However, in some embodiments, a filter/screen (NucFil® or Poral®, as examples) may be added to the hydrogen vent on the vessel for transport or storage.

Figure 20:
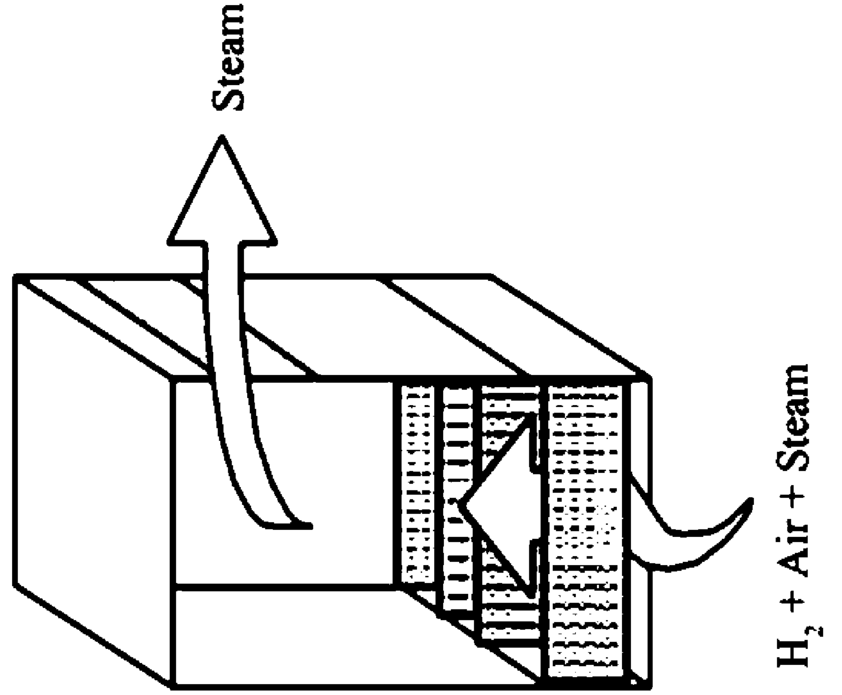
FIG. 20 depicts an example catalytic recombiner.
Figure 21:
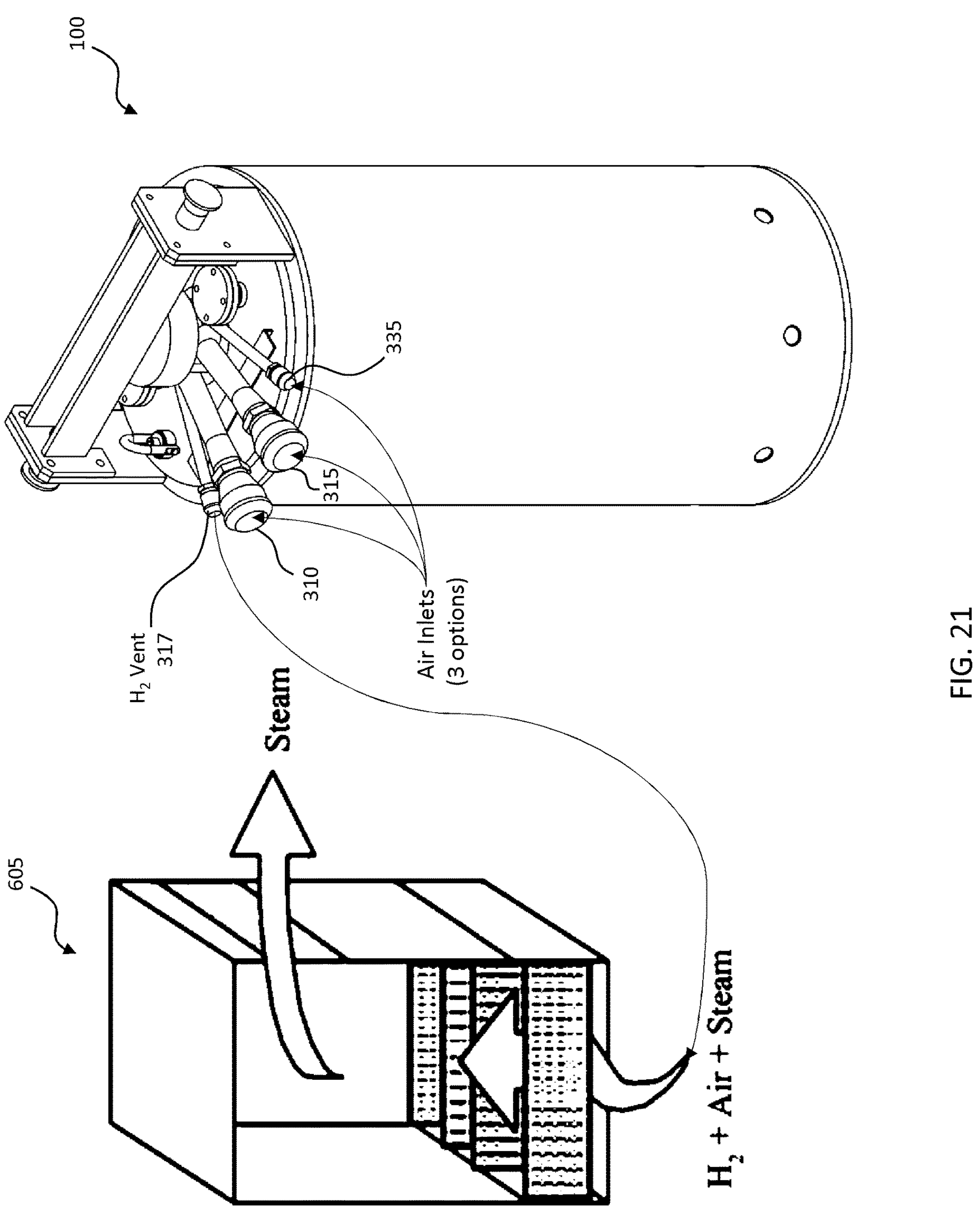
FIG. 21 depicts an embodiment wherein a catalytic recombiner is attached to the IX assembly of FIG. 1.

In some embodiments, the vessel contents may be removed, processed, and packaged for final disposal. Since hydrogen is naturally vented to the atmosphere at less than the flammability limit, recombiners are generally considered unnecessary; however, recombiners may be added to the final disposal container, in some embodiments. FIG. 20 depicts an example catalytic recombiner. In some embodiments, a commercially available catalytic recombiner may be added into the vessel post-operation and drying through a fill port or other inlet, as depicted in FIG. 21. Recombination may be added to a vessel overpack or secondary containment. Any type of recombiner may be used. In FIG. 21, hydrogen may vent from $H_2$ vent 317 on the IX assembly 100 and flow up into the recombiner 605. During operation, ports 310, 315, and 335 are an outlet, inlet, and dewatering tube, respectively. During storage, one or more of these ports 310, 315, and 335 may be repurposed as air inlets.

Sensing and Control

One or more sensors and instruments may be used to monitor and control the system throughout the process. The positions and types of sensors and/or instruments may be dependent upon the scale of the process as well as the chemical properties of the process fluid, among other design considerations. Types of sensors may comprise one or more of contact sensors, non-contact sensors, capacitive sensors, inductive sensors, 3D imagers, fiber optic cables, cameras, thermal imagers, thermometers, pressure sensors, radiation detectors, LIDAR, and microphones, among others. In some embodiments, one or more infrared (IR) cameras, with or without radiation shielding, may be used in the system.

Some embodiments may comprise one or more imaging sensors. The one or more imaging sensors may comprise one or more of 3D imaging, 2D range sensor, camera (such as an IR camera or radiation shielded IR camera, in some embodiments), thermal imager, and radiation detector, among others. One or more imaging sensors may be used to provide inspection and monitoring capabilities for remote operators. Signals from one or more imaging sensors may be displayed in real-time, recorded for later review, and/or recorded for operational records. Any one or more of the cameras may be one of fixed or pan-tilt-zoom types. An operator may select and manage desired camera views for operations, while controlling the cameras with associated control features such as the pan, tilt, zoom (PTZ), focus, and lights. In an embodiment, proper visual coverage of operations may be made possible by a camera system through adequate camera coverage, determined by camera quantity and location.

In some embodiments, sensors are added merely for tracking of the properties of the materials throughout the process. In some embodiments sensor data is used to control the operation of the system. Some embodiments may utilize sensor fusion algorithms to analyze data retrieved from one or more sensors of one or more different types. In some embodiments, the sensor data will automatically be analyzed and automatically effect changes in the control system for the process requiring little to no input from a human operator. In some embodiments, the sensor data and or analysis is displayed for a human operator to perform manual adjustments.

In some embodiments, appropriate sensors may be used to monitor process conditions at one or more key locations to identify issues early, including one or more of process flow, pressure, and temperature, as well as activity levels (dose) at one or more key locations.

Control

In some embodiments, the control system may capture, store, and trend key process and facility data including but not limited to activity levels, temperatures, pressures, and flow rates. In some embodiments, data may be processed on-site in near real-time. In some embodiments, data and/or processed information may be transmitted to a remote location for long-term storage. In some embodiments, the control system may have a Human Machine Interface (HMI) to control relevant systems and processes.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate implementations can also be implemented in combination in a single implementation. Conversely, various features that are described in the context of a single implementation can also be implemented in multiple implementations separately or in any suitable subcombination. Moreover, although features may be described above in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, include, and including should be interpreted to be synonymous with the terms comprise and comprising. The use of these terms should also be understood as disclosing and providing support for narrower alternative implementations where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any implementation, feature, or combination of features described or illustrated in this document. This is true even if only a single implementation of the feature or combination of features is illustrated and described.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An ion exchange vessel for treating contaminated fluid, comprising:

- a shell, wherein the shell comprises an inner shell wall and an outer shell wall forming an annular chamber therebetween;
- one or more fill ports configured to distribute at least one of ion exchange media or sorbents into the annular chamber;
- three or more inlet headers operably configured in the annular chamber, wherein each inlet header is ring-shaped and wherein each inlet header comprises one or more inlet nozzles and wherein the one or more inlet nozzles are operably configured to distribute contaminated fluid homogeneously into the at least one of ion exchange media or sorbents;

two or more outlet headers operably configured in the annular chamber, wherein each outlet header is ring-shaped and wherein each outlet header comprises one or more outlet nozzles configured to remove fluid from the annular chamber and wherein the two or more outlet headers and the three or more inlet headers are evenly distributed and alternate along a central vertical axis of the ion exchange vessel;

a vent configured to at least one of vent hydrogen or dissipate heat from the annular chamber;

a dewatering system configured to transport excess water from the annular chamber;

an inner ventilation channel within the inner shell wall; and a shield comprising at least one of lead metal, steel, or depleted uranium, and wherein the shield comprises one or more lifting lugs and one or more shield ventilation inlets.

2. The ion exchange vessel of claim 1, wherein the ion exchange vessel and the shield are cylindrically shaped.

3. The ion exchange vessel of claim 1, wherein the shield is configured to fit over the ion exchange vessel.

4. The ion exchange vessel of claim 1, wherein an outlet ventilation channel is formed between the shield and the shell of the ion exchange vessel.

5. The ion exchange vessel of claim 1, wherein the shell comprises one or more shell ventilation inlets that correlate to the one or more shield ventilation inlets.

6. The ion exchange vessel of claim 1, further comprising a catalytic recombiner.

7. The ion exchange vessel of claim 1, wherein the ion exchange vessel is contained in a mobile processing skid.

8. An ion exchange system for treating contaminated fluid, comprising:

one or more shields, each comprising at least one of lead metal, steel, or depleted uranium, and wherein the one or more shields each include one or more lifting lugs and one or more shield ventilation inlets; and one or more ion exchange vessels, each comprising:

a shell, wherein the shell comprises an inner shell wall and an outer shell wall forming an annular chamber therebetween;

one or more fill ports configured to distribute at least one of ion exchange media or sorbents into the annular chamber;

three or more inlet headers operably configured in the annular chamber, wherein each inlet header is ring-shaped and wherein each inlet header comprises one or more inlet nozzles and wherein the one or more inlet nozzles are operably configured to distribute contaminated fluid homogeneously into the at least one of ion exchange media or sorbents;

two or more outlet headers operably configured in the annular chamber, wherein each outlet header is ring-shaped and wherein each outlet header comprises one or more outlet nozzles configured to remove fluid from the annular chamber and wherein the two or more outlet headers and the three or more inlet headers are evenly distributed and alternate along a central vertical axis of each of the one or more ion exchange vessels;

a vent configured to at least one of vent hydrogen or dissipate heat from the annular chamber;

a dewatering system configured to transport excess water from the annular chamber; and an inner ventilation channel within the inner shell wall.

9. The ion exchange system of claim 8, wherein the one or more ion exchange vessels and the one or more shields are cylindrically shaped.

10. The ion exchange system of claim 8, wherein the one or more shields are configured to fit over the one or more ion exchange vessels.

11. The ion exchange system of claim 8, wherein an outlet ventilation channel is formed between each of the one or more shields and the shell of a corresponding one of the one or more ion exchange vessels.

12. The ion exchange system of claim 8, wherein the shell of each of the one or more ion exchange vessels comprises one or more shell ventilation inlets that correlate to the one or more shield ventilation inlets of a corresponding one of the one or more shields.

13. The ion exchange system of claim 8, further comprising a catalytic recombiner.

14. The ion exchange system of claim 8, wherein the one or more ion exchange vessels are contained in a mobile processing skid.

* * * * *